(12) United States Patent  (10) Patent No.: US 6,661,608 B2
Matsui et al.  (45) Date of Patent: Dec. 9, 2003

(54) STRUCTURE FOR MOUNTING A MAGNETIC HEAD TO A CHASSIS

(75) Inventors: Kiyoshi Matsui, Koide-machi (JP); Atsushi Shibata, Nara (JP)

(73) Assignee: Funai Electric Co., Ltd., Daito (JP)

( * ) Notice: Subject to any disclaimer, the term of this patent is extended or adjusted under 35 U.S.C. 154(b) by 198 days.

(21) Appl. No.: 09/910,946

(22) Filed: Jul. 24, 2001

(65) Prior Publication Data

US 2002/0024773 A1 Feb. 28, 2002

(30) Foreign Application Priority Data

Jul. 24, 2000 (JP) ........................................ 2000-005201

(51) Int. Cl.[7] .............................. G11B 5/56; G11B 21/16
(52) U.S. Cl. ...................... 360/129; 360/128; 360/291.3
(58) Field of Search ................................. 360/103, 129, 360/128, 291.1, 290, 291, 241

(56) References Cited

U.S. PATENT DOCUMENTS

| 2,861,134 | A | * | 11/1958 | Gernert ....................... 360/290 |
| 3,761,644 | A | * | 9/1973 | Camras ................... 360/291.3 |
| 4,329,723 | A | * | 5/1982 | Schoenmakers ......... 360/291.2 |
| 4,605,978 | A | * | 8/1986 | Zeavin ....................... 360/241 |
| 5,055,956 | A | * | 10/1991 | Kaya et al. ............... 360/291.3 |
| 5,251,087 | A | * | 10/1993 | Sakashita et al. .............. 341/15 |
| 5,880,909 | A | * | 3/1999 | Jeong et al. ............. 360/291.3 |
| 5,892,639 | A | * | 4/1999 | Kim ......................... 360/291.3 |
| 5,949,628 | A | * | 9/1999 | Noboryu et al. ............ 360/128 |

FOREIGN PATENT DOCUMENTS

| JP | SHO57110727 | 12/1955 | |
| JP | SHO6230219 | 8/1987 | |
| JP | SHO6235142 | 9/1987 | |
| JP | 11-316924 | * 11/1999 | ............ G11B/5/49 |

* cited by examiner

Primary Examiner—Jefferson Evans
(74) Attorney, Agent, or Firm—Crowell & Moring LLP

(57) ABSTRACT

In a mounting structure for mounting a conductive shielding case, accommadating therein an audio magnetic head, to a chassis via of an adjusting plate, columnar protrusions formed on both side surfaces of the shielding case are engaged with groove portions formed on cut and raised pieces of the adjusting plate. With this arrangement, it is possible to fix the shielding case and the adjusting plate. Thus it is possible to fix the shielding case to the adjusting plate without using screws, and thereby be decrease the cost of parts and manufacture.

10 Claims, 3 Drawing Sheets

STRUCTURE FOR MOUNTING A MAGNETIC HEAD TO A CHASSIS

BACKGROUND OF THE INVENTION

The present invention relates to an audio magnetic head mounted in video cassette recorders (VCRs) or audio tape decks, and particularly to a structure for mounting a head and an adjusting plate for mounting the head to a chassis.

Conventionally, an audio magnetic head is known to be disposed within a shielding case made of conductive metal wherein this shielding case is mounted to a chassis by means of an adjusting plate for azimuth adjustment to enable adjustments in height and angle of the head. While screws had been conventionally used for mounting the shielding case and the adjusting plate, in some cases threads were damaged at the time of screwing owing to a thin wall thickness of the shielding case that caused the threads to be shallow so that screwing could not be performed. It is further known to connect the shielding case and the adjusting plate through spot welding.

In order to solve the above-described problem of damages in the threads, as illustrated in FIG. 5, it has been devised to employ a tap plate 55 provided as a separate member for mounting the shielding case 54 to the adjusting plate 50. In this structure, the tap plate 55 formed with a tap that engages with a screw portion of a screw 51 is fixed to the shielding case 54, wherein the shielding case 54 is fixed by fastening the screw 51 upon inserting the screw 51 through hole portions 52, 53 formed on the adjusting plate 50 and the shielding case 54.

In another known arrangement for placing of a magnetic head to a mounting base, a projecting portion formed on the magnetic head is fitted into a groove formed on the mounting base whereupon both members are fitted and fixed (see, for instance, Japanese Unexamined Utility Model Publication No. SHO 63(1988)-6507 gazette, Japanese Unexamined Utility Model Publication No. Hei 1(1989)-93602 gazette and Japanese Utility Model Registration No. 2,555,512 gazette).

However, the above-described arrangement as illustrated in FIG. 5 is disadvantaged in that in addition to be necessary to form holes on the adjusting plate 50 and the shielding case 54 for inserting the screw 51 through, it is also necessary to form a tap on the tap plate 54, and the necessity of requiring the tap plate 55 and the screw 51 for fixing the adjusting plate 50 and the shielding case 54 resulted in an increased number of parts and assembling process and thus in higher manufacturing costs of the heads.

Moreover, since each magnetic head disclosed in the latter publications is an erasing head that does not require grounding, a case accumulating (i.e., accomodating) the head therein and a mounting base for such a case is a molded article made of plastics and in a complicated shape. In contrast thereto, an audio head requires grounding for shielding purposes so that it is necessary to form the shielding case and the mounting base of conductive metallic material that is difficult to be formed into a complicated shape when compared to one of a molded article made of plastics. This means that it is difficult to employ any of the structures that are disclosed in the referenced gazettes to an audio head. While mounting through spot welding would eliminate the necessity of providing a screw and a tap plate, it is difficult to accurately weld the magnetic head at an inclined angle since the magnetic head itself is in an elongated shape in height and an area of a surface to be spot welded is small.

SUMMARY OF THE INVENTION

The present invention has been made for solving the above-described conventional problems, and it is an object thereof to provide a structure for mounting an audio magnetic head to a chassis with which it is possible to fix the shielding case and the adjusting plate without using screws and to achieve low costs by decreasing the number of parts and assembling process.

For achieving the above objects, the present invention provides for a structure for mounting a head such that a head main body with an audio head for magnetic tapes is mounted to a chassis to be adjustable in height and angle, the structure comprising:

a shielding case made of conductive material for accumulating the head main body in its interior; and an adjusting plate made of conductive material for supporting the shielding case with respect to the chassis to be adjustable in height and angle in an electrically conducted condition, wherein conductive protrusions are formed on right and left side surfaces of the shielding case;

a pair of cut and raised pieces are formed on the adjusting plate through cutting and raising which oppose each other while leaving a clearance for pinching the shielding case between the pieces, groove portions for engaging with the protrusions of the shielding case are formed on the cut and raised pieces; wherein the shielding case is fixed to the adjusting plate by engaging the protrusions of the shielding case with the groove portions.

In the above arrangement, the shielding case accumulating therein the head main body may be mounted to the adjusting plate for adjusting the position of the head by engaging the conductive protrusions formed on the shielding case with the groove portions formed on the cut and raised pieces of the adjusting plate. With this arrangement, it will be no longer necessary to employ screws or tap plates as in the prior art, and it is thus possible to decrease manufacturing costs by decreasing the number of parts and mounting process.

In the above structure for mounting the head, one end of each groove portion of the cut and raised pieces is open and extends in a horizontal direction so that the shielding case and the adjusting plate may be electrically conducted by engaging the protrusions with the groove portions. With this arrangement, the protrusions and groove portions are allowed to contact in a planar manner, and it is possible to sufficiently secure conductivity and to ensure grounding of the shielding case.

In the above structure for mounting the head, the protrusions are formed in a round shape, and edges of the groove portions for engaging with the protrusions are formed as concave portions assuming arc-like shapes that fit along outer shapes of the protrusions at their interior end for positioning the protrusions. With this arrangement, the protrusions and the groove portions will contact in a planar manner so that it is possible to reliably perform grounding of the shielding case. Moreover, the positioned shielding case will not be shifted in position also upon receiving impact.

In the above structure for mounting the head, the groove portions are formed to be of a height with which the cut and raised pieces are flexed in the course of inserting the protrusions into the groove portions. In the above structure for mounting the head, an adhesive is filled into engaging portions between the groove portions and the protrusions. With this arrangement, the protrusions that are inserted in the groove portions may be reliably positioned and occurrence of positional shifts is eliminated.

In the above structure for mounting the head, the adjusting plate is supported to the chassis through adjusting screws at at least three dispersed points, each of which are adjustable in height, and is further urged upward through urging force of a compression spring inserted between the adjusting plate and the chassis.

DETAILED DESCRIPTION OF THE PREFERRED EMBODIMENTS

Figure 1:
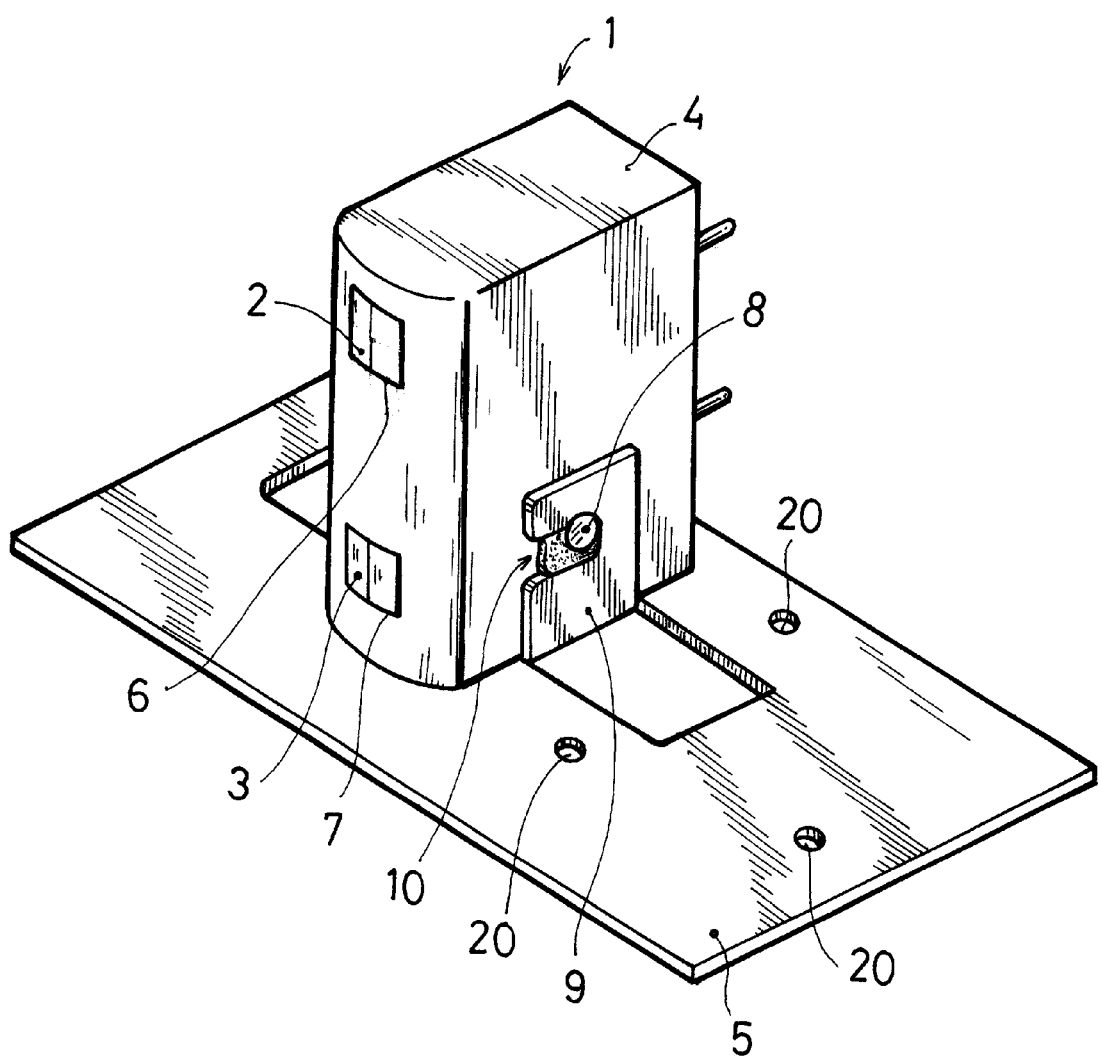
FIG. 1 is a perspective view of a structure for mounting an audio magnetic head according to one embodiment of the present invention.
Figure 2:
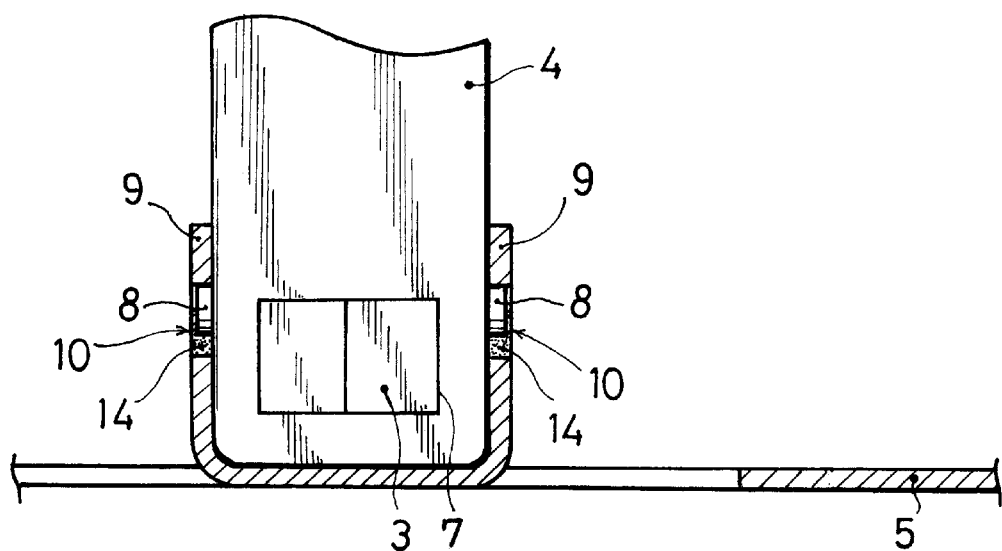
FIG. 2 is a front view of the magnetic head.
Figure 3:
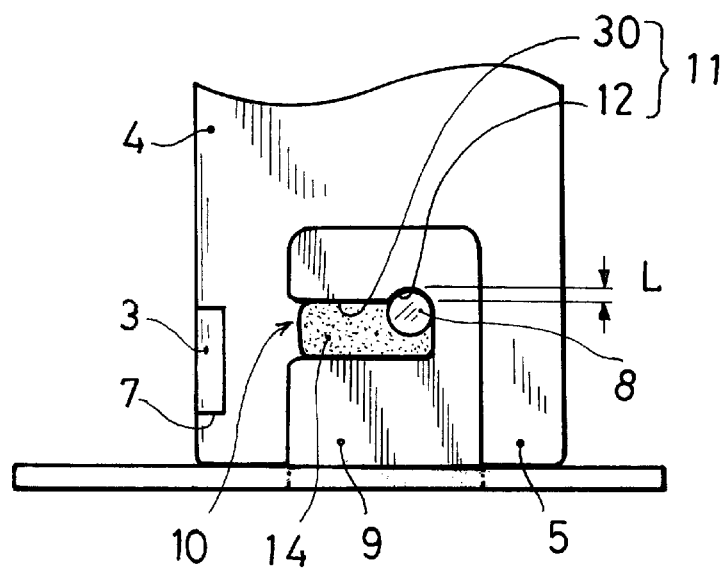
FIG. 3 is a side view of the magnetic head.

The structure for mounting the audio magnetic head to a chassis according to one embodiment of the present invention will now be explained with reference to the drawings. FIG. 1 shows an external appearance of an audio magnetic head, FIG. 2 shows a front view thereof and FIG. 3 shows a side view thereof. The magnetic head 1 is comprised of an audio head 2 and a control head 3 disposed in longitudinal directions at a specified distance with respect to each other, and a shielding case 4 formed of conductive material accumulating these members in its interior, wherein the shielding case 4 is mounted to an adjusting plate 5 for azimuth adjustment formed of conductive metallic material. The shielding case 4 is formed with a window portion 6 through which the audio head 2 is exposed as well as with a window portion 7 through which the control head 3 is exposed. Conductive protrusions 8 are further formed at suitable positions on both right and left side surfaces of the shielding case 4. The protrusions 8 are uniformly formed with the shielding case 4 through jut forming in a columnar shape. Three holes 20 are formed on the adjusting plate 5 into which screws for positional adjustment, to be described later, are inserted.

For manufacturing the head, the audio head 2 and the control head 3 assembled to a holder, not shown, are first inserted from an open surface opposite to the surface on which the window portions 6, 7 of the shielding case 4 are formed, whereupon resin material is filled into the shielding case 4 for fixing the heads 2 and 3 within the shielding case 4. At this time, resin is filled between an edge of the window portion 6 and the audio head 2 as well as between an edge of the window portion 7 and the control head 3 so as to prevent electric conduction between the audio head 2 and the control head 3 as well as between the window portion 6 and the window portion 7. A surface of the shielding case 4 formed with the window portions 6, 7 to which the audio head 2 and the control head 3 face is processed through grinding to comprise a tape running surface.

A pair of mutually opposing cut and raised pieces 9 are formed on the adjusting plate 5 through cutting and raising. The cut and raised pieces 9 are formed through stamping as well as bending and raising sheet metal while leaving a clearance for allowing the shielding case 4 for the audio head 1 to be pinched through both sides thereof. The cut and raised pieces 9 are formed with groove portions 10 that engage with protrusions 8 formed on the shielding case 4 when the shielding case 4 is pinched therein. One end of each of the groove portions 10 is open and extends in a horizontal direction.

The shielding case 4 is inserted between the pair of cut and raised pieces 9, and thereupon engaging the protrusions 8 formed on the shielding case 4 side with the groove portions 10 of the cut and raised pieces 9. Engaging edges 11 of the groove portions 10 for engaging with the protrusions 8 are formed with round or arc-like concave portions for positioning 12, obtained through notching upward by distance L from linear portions 30 of the groove portions 10 at their interior end. When the shielding case 4 is placed at the cut and raised pieces 9 to cause the protrusions 8 engage with the concave portions for positioning 12, the round protrusions 8 will contact the bent and raised portions 9 in a planar manner rather than in a spot manner, to thereby enable reliable grounding of the shielding case 4. Upon engaging the protrusions 8 with the concave portions for positioning 12, the shielding case 4 and the adjusting plate 5 are fixed by filling an adhesive 14 such as epoxy group resin into spaces of the groove portions 10. The cut and raised pieces 9 made of metallic material will be in a slightly flexed condition in the course of inserting the protrusions 8 into the engaging edges 11, and the protrusions 8 will be press-fit into the groove portions 10 in this condition.

Figure 4:
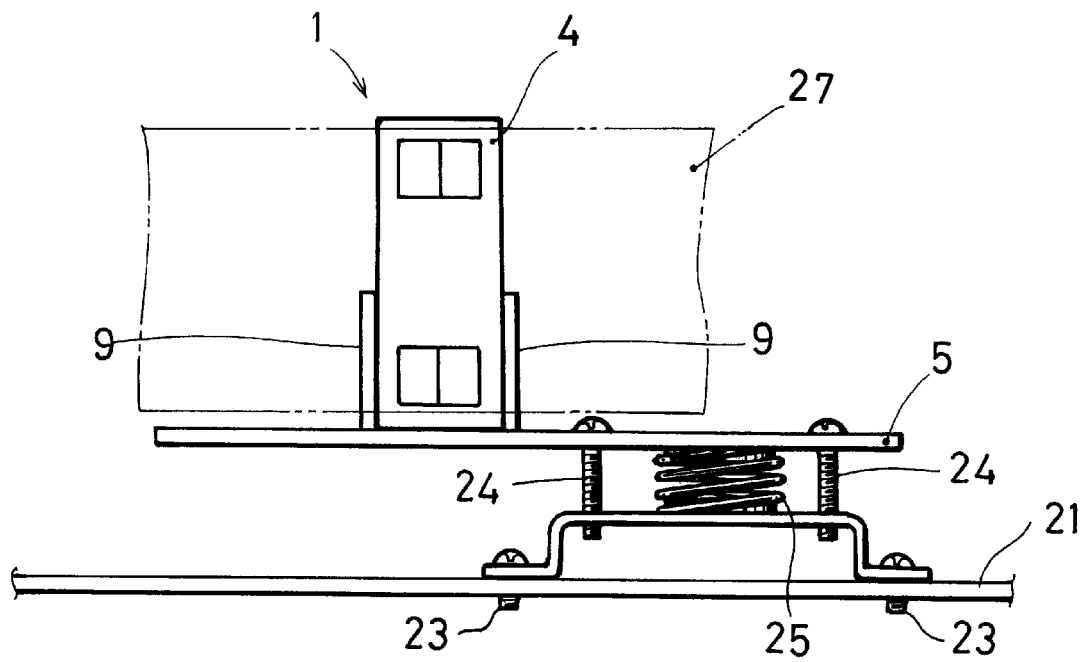
FIG. 4 is a view illustrating the magnetic head mounted to the chassis.
Figure 5:
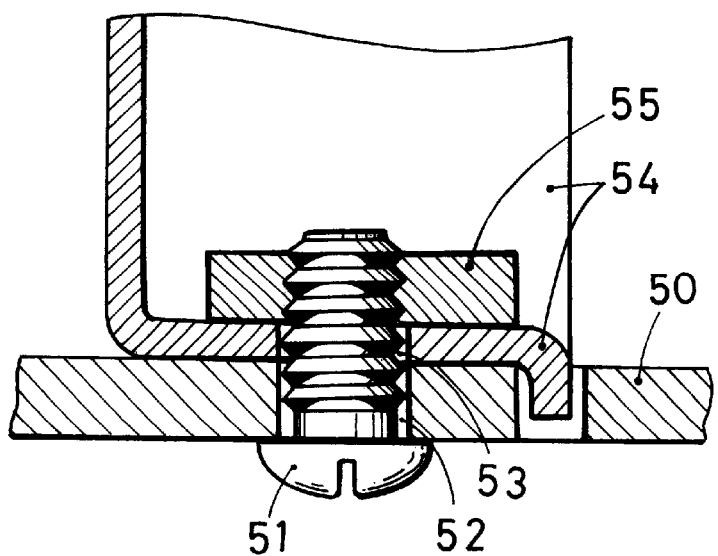
FIG. 5 is a sectional view of a conventional audio magnetic head.

FIG. 4 illustrates a condition in which the magnetic head 1 is mounted to a chassis 21. A mounting base 22 is mounted to the chassis 21 through screws 23. The mounting base 22 is formed with a tap into which three adjusting screws 24 (while only two thereof are illustrated in the drawing), which are inserted through three holes 20 formed on the adjusting plate 5 (see FIG. 1), are screwed and fixed. A compression spring 25 is disposed between the adjusting plate 5 and the supporting base 22, and the adjusting plate 5 is urged in a upward direction through urging force of the compression spring 25. When performing positional adjustment of the adjusting plate 5, the magnetic head 1 may be adjusted in inclination and height by respectively adjusting the degree of fastening the three adjusting screws 24 such that it is positioned at an optimal height and angle with respect to a running tape 27.

According to the magnetic head 1 of the present embodiment, the head 1 is mounted to the adjusting plate 5 through engagement and fixing of the protrusions 8 disposed at the shielding case 4 for accumulating the head 1 with the groove portions 10 provided at the cut and raised pieces 9 of the adjusting plate 5, so that it is possible to omit screws and tap plates for connecting the shielding case 4 with the adjusting plate 5, and thus to decrease manufacturing costs by achieving decreases in the number of parts and assembling procedures.

The present invention is not limited to the above-described constitution of embodiment but may be varied in various ways, and is applicable to all kinds of magnetic heads that are accumulated in shielding cases requiring grounding.

What is claimed is:

1. A structure for mounting a head such that a head main body with an audio head for magnetic tapes is mounted to a chassis to be adjustable in height and angle, comprising:

a shielding case made of conductive material for accommodating said head main body in its interior; and an adjusting plate made of conductive material for supporting said shielding case with respect to the chassis to be adjustable in height and angle in an electrically conductive condition, wherein conductive protrusions are formed on right and left side surfaces of said shielding case, a pair of cut and raised pieces are formed on the adjusting plate through cutting and raising which oppose each other while leaving a clearance for pinching the shielding case between the pieces, groove portions for engaging with the protrusions of the shielding case are formed on the cut and raised pieces; wherein the shielding case is fixed to the adjusting plate by engaging the protrusions of the shielding case with the groove portions.

2. The structure for mounting a head as claimed in claim 1, wherein one end of each groove portions of the cut and raised pieces is open and extends in a horizontal direction, and the shielding case and the adjusting plate are conductively coupled by engaging the protrusions with the groove portions.

3. The structure for mounting a head as claimed in claim 2, wherein the protrusions are formed in a round shape, and edges of the groove portions for engaging with the protrusions are formed as concave portions inward assuming arc-like shapes that fit along outer shapes of the protrusions at their interior end for positioning the protrusions.

4. The structure for mounting a head as claimed in claim 3, wherein the groove portions are provided at a height with which said cut and raised pieces are flexed in the course of inserting the protrusions into the groove portions.

5. The structure for mounting the head as claimed in claim 3, wherein an adhesive is filled into engaging portions between the groove portions and the protrusions.

6. The structure for mounting the head as claimed in claim 1, wherein the adjusting plate is supported to the chassis through at least three dispersed adjusting screws, each of which are adjustable in height.

7. The structure for mounting the head as claimed in claim 6, wherein the adjusting plate is urged upward through urging force of a compression spring inserted between the adjusting plate and the chassis.

8. The structure for mounting the head as claimed in claim 6, wherein the adjusting plate is provided for azimuth adjustment for adjusting the head in height and angle.

9. The structure for mounting the head as claimed in claim 6, wherein a head main body is comprised of an audio head and a control head.

10. A structure for mounting a head such that a head main body with an audio head for magnetic tapes is mounted to a chassis to be adjustable in height and angle, comprising:

a shielding case made of conductive material for accommodating the head main body in its interior; and an adjusting plate made of conductive material for supporting the shielding case with respect to the chassis to be adjustable in height and angle in an electrically conductive condition, wherein conductive protrusions are formed on right and left side surfaces of the shielding case, a pair of cut and raised pieces are formed on the adjusting plate through cutting and raising which oppose each other while leaving a clearance for pinching the shielding case between the pieces, groove portions for engaging with the protrusions of the shielding case are formed on the cut and raised pieces; wherein the shielding case is fixed to the adjusting plate by engaging the protrusions of the shielding case with the groove portions, a supporting base is mounted onto the chassis, and said adjusting plate is supported on said supporting base by adjusting screws at at least three dispersed points each of which are adjustable in height.

* * * * *